US012757120B1

(12) United States Patent
Kapur et al.

(10) Patent No.: US 12,757,120 B1
(45) Date of Patent: Oct. 6, 2026

(54) CONTROLLING HIBERNATION OF NETWORK DEVICES TO MANAGE ENERGY CONSUMPTION

(71) Applicant: Juniper Networks, Inc., Sunnyvale, CA (US)

(72) Inventors: Sukhdev S. Kapur, Saratoga, CA (US); Richard Roberts, Rennes (FR); Gert Grammel, Ditzingen (DE); Arda Akman, San Ramon, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 332 days.

(21) Appl. No.: 18/491,221

(22) Filed: Oct. 20, 2023

(51) Int. Cl.
*H04W 48/16* (2009.01)
*H04W 52/02* (2009.01)

(52) U.S. Cl.
CPC ....... *H04W 52/0248* (2013.01); *H04W 48/16* (2013.01)

(58) Field of Classification Search
CPC .......................... H04W 52/0248; H04W 48/16
USPC .......................................................... 370/311
See application file for complete search history.

(56) References Cited

U.S. PATENT DOCUMENTS

2020/0413331 A1* 12/2020 Sandgren .......... H04W 52/0203
2022/0407664 A1* 12/2022 Wang .................... H04L 5/0098
2024/0073661 A1* 2/2024 Park ...................... H04W 88/08
2024/0223410 A1* 7/2024 Nakazato .............. H04W 24/04
2024/0271950 A1* 8/2024 Nakazato .............. H04W 88/02
2024/0323755 A1* 9/2024 Jiang ..................... H04W 24/02

FOREIGN PATENT DOCUMENTS

WO WO-2023127097 A1 * 7/2023 ......... G01C 21/3453

OTHER PUBLICATIONS

3GPP, "3rd Generation Partnership Project; Technical Specification Group Services and System Aspects; System architecture for the 5G System (5GS); Stage 2 (Release 17)", 3GPP A Global Initiative, vol. 17, 3GPP Organizational Partners, Mar. 2021, 489 pp.

(Continued)

*Primary Examiner* — Faisal Choudhury
(74) *Attorney, Agent, or Firm* — Shumaker & Sieffert P.A.

(57) ABSTRACT

A controller includes a memory and processing circuitry in communication with the memory. The processing circuitry is configured to instruct, via a first intermediate network device, a first radio unit (RU) to discover whether a second RU is transitioning from a hibernation mode to an active mode and receive, via the first RU and the first intermediate network device, information indicating that the second RU is transitioning to the active mode. A first active route connects the first RU to a core network via the first intermediate network device. The processing circuitry is also configured to cause, based on receiving the information indicating that the second RU is transitioning to the active mode, a second intermediate network device operating to transition from the hibernation mode to the active mode so that a second active route connects the second RU to the core network via the second intermediate network device.

20 Claims, 7 Drawing Sheets

(56) References Cited

OTHER PUBLICATIONS

3GPP, "3rd Generation Partnership Project; Technical Specification Group Services and System Aspects; System architecture for the 5G System (5GS); Stage 2 (Release 18)", 3GPP A Global Initiative, vol. 18, No. 2, 3GPP Organizational Partners, Jul. 2023, 694 pp.

O-Ran Alliance, "O-Ran Architecture Description", vol. 7, Oct. 21, 2022, 38 pp., https://orandownloadsweb.azurewebsites.net/specifications.

* cited by examiner

CONTROLLING HIBERNATION OF NETWORK DEVICES TO MANAGE ENERGY CONSUMPTION

TECHNICAL FIELD

This disclosure relates to computer networks and, more specifically, to improving energy efficiency in mobile networks.

BACKGROUND

A network device may be configured to operate according to an active mode and according to a hibernation mode. In the hibernation mode, the network device may alternate between sleep phases and wake-up phases. The network device is inactive and may communicate during wake-up phases, but is inactive during sleep phases. In the active mode, the network device remains awake and configured for communication. Since a network device is continuously active when operating in the active mode, the network device draws a greater amount of power when operating in the active mode as compared with an amount of power that the network device draws when operating in the hibernation mode. To conserve power, network devices may operate in the hibernation mode.

SUMMARY

In general, the disclosure describes techniques for controlling operating modes of mobile network devices of a radio access network (RAN) of a mobile network to manage energy consumption and UE connectivity. For example, a network system may include a Service Management and Orchestration (SMO) framework offering various framework functions along with a non-real-time (non-RT) RAN Intelligent Controller (RIC), which may be configured in accordance with Open Radio Access Network (O-RAN) standards ("O-RAN architecture"), to manage and/or monitor aspects of a RAN and/or 5G core. The O-RAN architecture may include a non-RT RIC and a near-real-time RIC (near-RT RIC) that each executes different functions and services for RAN functions.

In an example of the described techniques for controller operating modes of mobile network devices in a RAN, a set of network devices of a RAN may connect a set of client devices with a core network. One or more routes may exist through the set of network devices that connect client devices, i.e., User Equipment (UE) devices, with the core network. An active route includes network devices operating in an active mode. A route may be inactive when one or more network devices along the route is operating in a hibernation mode. A controller may control an operation mode of one or more of the network devices to manage active routes through the set of network devices so that client devices have connectivity through the RAN to the core network, while managing power consumption by the set of network devices.

O-RAN-based networks may include three functional units: a Radio Unit (RU), a Distributed Unit (DU), and a Centralized Unit (CU). An RU manages the radio frequency layer and has antenna arrays of various sizes and shapes. A DU performs lower layer protocol processing. A CU performs the upper layer protocol processing. A UE device may connect to the core network by communicating with an RU. The RU may communicate with a DU, the DU may communicate with a CU, and the CU may communicate with the core network. That is, a UE device may send information to the core network via an active route through an RU, a DU, and a CU and the core network may send information to the UE device via the CU, the DU, and the RU. In some examples, CUs and DUs may be referred to as "intermediate network devices," because CUs and DUs are located between RUs and the core network in the RAN topology.

In some examples, a controller may use an active route through one or more network devices of a RAN to instruct a first RU to determine whether second RU is transitioning from the hibernation mode to the active mode. Based on determining that the second RU is transitioning to the active mode, the controller may cause one or intermediate network devices connecting the second RU with the core network to transition to the active mode to create an additional active route through the RAN. Based on determining that the second RU is not transitioning to the active mode, the controller may cause one or intermediate network devices connecting the second RU with the core network to remain in the hibernation mode. In some examples, the first RU is configured to communicate with the second RU even when the second RU is operating in the hibernation mode and/or when the intermediate network devices between the second RU and the core network are operating in the hibernation mode.

The techniques of this disclosure may provide one or more improvements to the computer-related field of computer networking that are integrated within a practical application. For example, by instructing a first RU, which is part of an active route through the RAN, to discover whether a second RU, which is not part of an active route through the RAN, is transitioning from the hibernation mode to the active mode, the controller may determine whether the second RU is transitioning to the active mode without causing one or more intermediate network devices between the second RU and the core network to transition to the active mode. This may allow the one or more intermediate network devices between the second RU and the core network to remain in the hibernation mode and conserve power unless the controller determines that the second RU is transitioning to the active mode. In other words, the controller may conserve power drawn by intermediate network devices more effectively as compared with controllers that do not monitor the hibernation status of an RU via other RUs and active routes without activating intermediate network devices to communicate with the RU.

In one example, a controller includes a memory; and processing circuitry in communication with the memory. The processing circuitry is configured to: instruct, via a first intermediate network device of a radio access network (RAN), the first intermediate network device operating in an active mode, a first radio unit (RU) of the RAN to discover whether a second RU of the RAN, the second RU operating in a hibernation mode, is transitioning to the active mode; and receive, via the first RU and the first intermediate network device, information indicating that the second RU is transitioning to the active mode, wherein a first active route connects the first RU to a core network via the first intermediate network device. The processing circuitry is also configured to cause, based on receiving the information indicating that the second RU is transitioning to the active mode, a second intermediate network device operating in the hibernation mode to transition from the hibernation mode to the active mode so that a second active route connects the second RU to the core network via the second intermediate network device.

In another example, a method includes instructing, by processing circuitry of the controller via a first intermediate network device of a radio access network (RAN), the first intermediate network device operating in an active mode, a first radio unit (RU) of the RAN to discover whether a second RU of the RAN, the second RU operating in a hibernation mode, is transitioning to the active mode, wherein the processing circuitry is in communication with a memory of the controller. The method also includes receiving, by the processing circuitry via the first RU and the first intermediate network device, information indicating that the second RU is transitioning to the active mode, wherein a first active route connects the first RU to a core network via the first intermediate network device; and causing, by the processing circuitry based on receiving the information indicating that the second RU is transitioning to the active mode, a second intermediate network device operating in the hibernation mode to transition from the hibernation mode to the active mode so that a second active route connects the second RU to the core network via the second intermediate network device.

In another example, non-transitory computer-readable media include instructions that, when executed by processing circuitry, cause the processing circuitry to: instruct, via a first intermediate network device of a radio access network (RAN), the first intermediate network device operating in an active mode, a first radio unit (RU) of the RAN to discover whether a second RU of the RAN, the second RU operating in a hibernation mode, is transitioning to the active mode; receive, via the first RU and the first intermediate network device, information indicating that the second RU is transitioning to the active mode, wherein a first active route connects the first RU to a core network via the first intermediate network device; and cause, based on receiving the information indicating that the second RU is transitioning to the active mode, a second intermediate network device operating in the hibernation mode to transition from the hibernation mode to the active mode so that a second active route connects the second RU to the core network via the second intermediate network device.

This summary is intended to provide an overview of the subject matter described in this disclosure. It is not intended to provide an exclusive or exhaustive explanation of the systems, devices, and methods described in detail within the accompanying drawings and description below. Further details of one or more examples are set forth in the accompanying drawings and the description below. Other features, objects, and advantages will be apparent from the description and drawings, and from the statements provided below.

DETAILED DESCRIPTION

Figure 1:
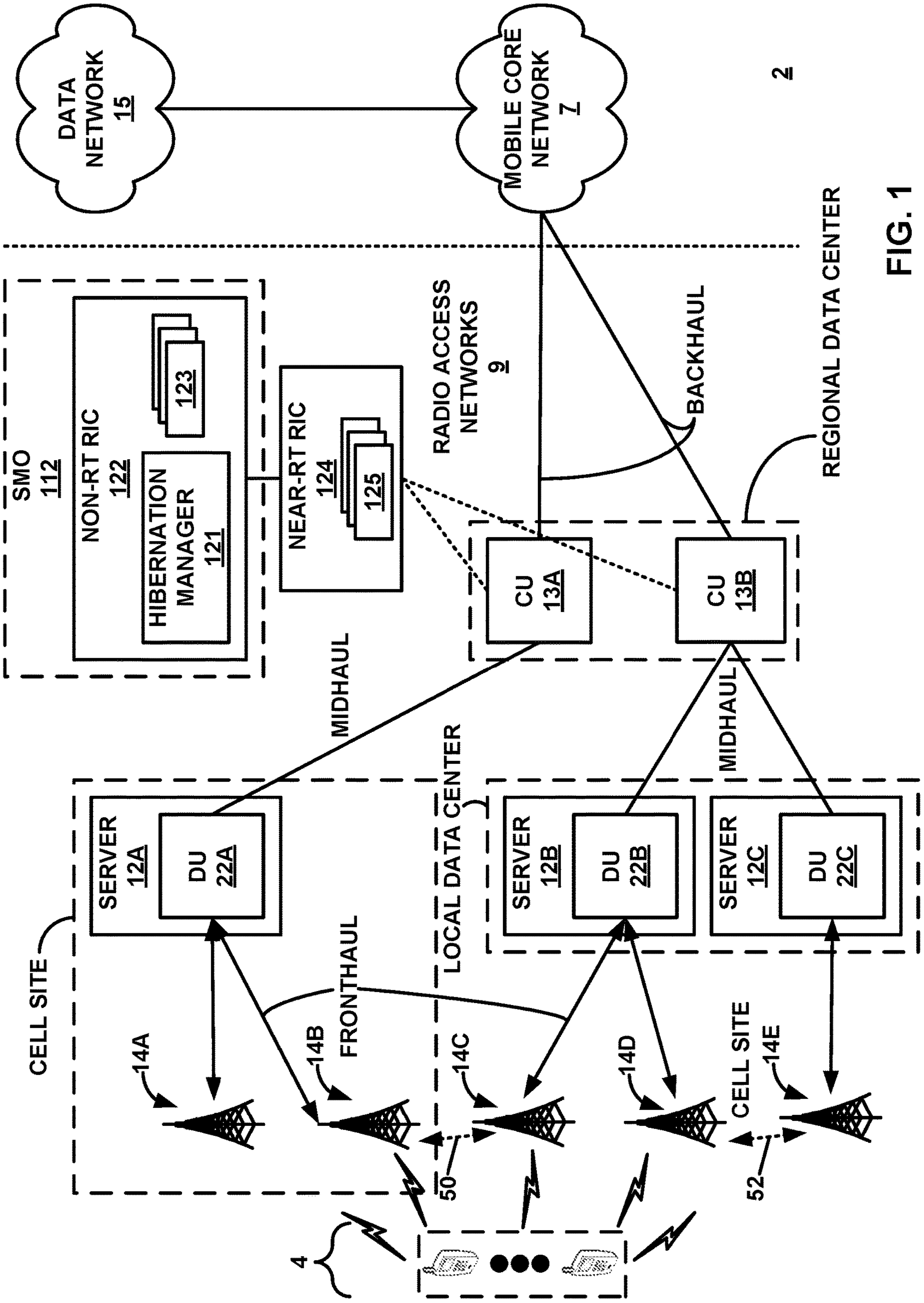
FIG. 1 is a block diagram illustrating an example mobile network system, in accordance with one or more techniques of this disclosure.

FIG. 1 is a block diagram illustrating an example mobile network system 2, in accordance with one or more techniques of this disclosure. Mobile network system 2 may be a 5G network that implements 5G standards promulgated by, e.g., the 3rd Generation Partnership Project (3GPP), the Open Radio Access Network (O-RAN) Alliance, the European Telecommunications Standards Institute (ETSI), the Internet Engineering Task Force (IETF), and the International Telecommunication Union (ITU). In the example illustrated in FIG. 1, mobile network system 2 includes mobile core network 7, radio access networks (RANs) 9, data network 15, Service and Management Orchestrator (SMO) 112, non-real time Radio Access Network Intelligent Controller (non-RT RIC) 122, and near-RT RIC 124. One or more RANs, e.g., RANs 9, and mobile core network 7 may provide user equipment devices 4 (collectively, "UEs 4") with access to one or more applications or services provided by data network 15.

A non-RT RIC is an orchestration and automation function configured to provide radio resource management, higher layer procedure optimization, policy optimization, and provide guidance, parameters, policies and artificial intelligence (AI) and/or machine learning (ML) models to support the operation of near-RT RIC functions in the RAN. The non-RT RIC may onboard one or more applications that provide non-real time (e.g., greater than one second) control of RAN elements and their resources, and the near-RT RIC may onboard one or more applications that provide near-real time control of RAN elements and their resources. The O-RAN architecture includes several interfaces, such as A1, O1, and O2 interfaces, that are each used to provide the functions and services by which the SMO and RIC can configure or direct other components of the RAN.

The functions and services of a non-RT RIC may include policy management services and/or enrichment information services for a near-RT RIC that are provided over an A1 interface (collectively referred to herein as "A1 services" because they provided over the A1 interface); performance management services, configuration management services, and/or Operations, Administration, and Management (OAM) services for O-RAN management elements that are provided over an O1 interface (referred to herein as "O1 services" because they are provided over the O1 interface); configuration management services and performance management services for resources of an O-RAN cloud that are provided over an O2 interface (referred to herein as "O2 services" because they are provided over the O2 interface), and/or other services, such as service management and exposure (SME) services (e.g., registration of a service, update of a service registration), data management and exposure (DME) services, and/or AI/ML services.

5G networks allow for disaggregation of mobile fronthaul and midhaul networks by building these networks around cloud native principles. As a result, service providers may avoid becoming locked into particular appliance vendors and may combine effective solutions from different vendors at different layers and locations to build and provision the mobile network system. This can improve the radio access networks (RANs), in particular, by making them more open, resilient, and scalable.

O-RAN-based networks decompose the baseband unit (BBU) found in traditional telecommunication networks into three functional units: a Radio Unit (RU), a Distributed Unit (DU), and a Centralized Unit (CU). An RU manages the radio frequency layer and has antenna arrays of various sizes and shapes. A DU performs lower layer protocol processing. A CU performs the upper layer protocol processing. Depending on operator and service requirements, RUs, DUs, and CUs can be deployed monolithically. For example, an RU, a DU, and a CU may reside within a cell site, or these functionalities can be distributed across cell sites while the CU resides in an edge cloud site controlling a plurality of distributed DUs. O-RAN is, for example, an approach to networking in which disaggregated functions can be used to deploy mobile fronthaul and midhaul networks. The disaggregated functions can be cloud-based functions.

Different functions of RUs, DUs, and CUs may be implemented by software executed by x86-based or ARM-based host servers. The CU can be further segregated into distinct control plane (CU-CP) and user plane (CU-UP) functions to further control and user plane separation (CUPS). This decoupling helps bring flexibility to deployment-different combinations of RU, DU, and CU may be deployed at the same location, or at different locations. For example, where latency is critical, RU, DU, and CU can be placed together at the edge. DUs and CUs that conform to O-RAN are often referred to as O-DUs and O-CUs, respectively.

In some examples, additional control plane elements operate in mobile core network 7. These control plane elements include Access Mobility Management Function (AMF) that provides access mobility management services, Network Exposure Function (NEF), Session Management Function (SMF) that provides session management services, Policy Control Function (PCF) that provides policy control services, User Data Management (UDM) that provides management of network user data, Network Repository Function (NRF) that provides a repository that can be used to register and discover services in a network operator's network, Application Function (AF), Authentication Server Function (ASUF) that provides authentication services, Network Slice Selection Function (NSSF), Network Slice Management Function (NSMF) that may be used to select an instance of an available network slice for use by any of UEs 4, and Network Slice Subnet Management Function (NSSMF) that provides coordination, management, and orchestration of network slice subnet instances (NSSI).

Additional data plane elements known as user plane functions (UPFs) operate in mobile core network 7 that provide packet routing, forwarding and other network data processing functions (e.g., Quality of Service, packet inspection, traffic optimization etc.). Further details on services and functions provided by the 5G core, can be found in 3$^{rd}$ Generation Partnership Project 2021, *Technical Specification Group Services and System Aspects; System architecture for the 5G System (5GS); Stage 2 (Release 17)*, TS 23.501 V17.0.0 (2021-03), which is superseded by 2021, *Technical Specification Group Services and System Aspects; System architecture for the 5G System (5GS); Stage 2 (Release 18)*, TS 23.501 V18.2.2 (2023-07), the entire contents of each of which are hereby incorporated by reference. Further details on the O-RAN architecture can be found in O-RAN Alliance, "O-RAN Architecture Description," version 7.00, October 2022, the entire contents of which is hereby incorporated by reference.

UEs 4 may represent smartphones, desktop computers, laptop computers, tablets, smart watches, and/or "Internet-of-Things" (IOT) devices, such as cameras, sensors, televisions, appliances, or the like. As shown in FIG. 1, mobile network system 2 includes RANs 109 that provides network access, data transport, and other services to UEs 4. In some examples, RANs 109 may include an O-RAN, a 5G mobile network RAN, a 4G LTE mobile network RAN, another type of RAN, or a combination of the above. RANs 9 include RUs 14A-14E (collectively, "RUs 14") located at various cellular network sites ("cell sites"). Each RU of RUs 14 includes a low physical layer (LO PHY) component and a radio frequency (RF) transmitter. The LO PHY component may be implemented using specialized hardware for high-performance packet processing.

RUs 14 may connect to DUs 22A-22C (collectively, "DUs 22") via the fronthaul network. The fronthaul network connects LO PHY and a high physical layer (HI PHY) and is used by RUs 14 and DUs 22 to implement an F2 interface of 5G. DUs 22 manage packet transmission via radio by the RUs 14. In some cases, such packet transmission conforms to the Common Packet Radio Interface (CPRI) and/or to the enhanced CPRI (eCPRI) standard, or to Institute of Electrical and Electronics Engineers (IEEE) 1914.3. DUs 22 may implement the Radio Link Control (RLC), Media Access Control (MAC), and the HI PHY layer. DUs 22 are at least partially controlled by CUs 13A-13B (collectively, "CUs 13").

DUs 22 connect to CUs 13 via the midhaul network, which may be used by DUs 22 and CUs 13 to implement an F1 interface of 5G. CUs 13 may implement the Radio Resource Control (RRC) and Packet Data Convergence Protocol (PDCP) layers. CUs 13 connect to mobile core network 7 via a backhaul network. The midhaul and backhaul networks may each be wide area networks (WANs).

In radio access networks 9 of mobile network system 2, a next-generation node B (gNodeB) includes a CU of CUs 13 and a DU of DUs 22. One CU may support more than one DUs to implement more than one gNodeBs. A single DU may support one RU or more than one RU. With respect to FIG. 1, CU 13A and DU 22A and one of RU 14A or RU 14B may form one gNodeB, and CU 13B and DU 22B and one or RU 14C or RU 14D may form another gNodeB.

As shown in FIG. 1, any DU of DUs 22 may or may not be located at a cell site that includes RUs of RUs 14 supported by the DU. For example, DU 22A is located at a cell site, while DU 22B and DU 22C are located at a local data center and collectively support multiple RUs 14. Mobile network system 2 may include radio access networks 9 that include many thousands of cell sites, each having one or more RUs of RUs 14 and optionally one or more DUs of DUs 22. Whether located at a cell site or offsite, a DU is typically within 20 km of the supported RUs. CUs 13 are illustrated in FIG. 1 as being located at a regional data center, typically within 40 km of the supported DUs 22.

Radio access networks 9 connect to mobile core network 7 to exchange packets with data network 15. Mobile core network 7 may be a 5G core network, and data network 15 may represent, for example, one or more service provider networks and services, the Internet, third party services, one or more internet protocol-virtual private networks (IP-VPNs), an internet protocol (IP)-multimedia subsystem, a combination thereof, or other or other network or combination of networks. In some examples, resources associated with the service provided by a mobile network operator to a tenant may be provided by, or managed by, functions of mobile core network 7 and/or components of RANs 9. In some examples, mobile core network 7 implements various discrete control plane and user plane functions for mobile network system 2.

Mobile network system 2 includes servers 12A-12C (collectively, "servers 12") to execute DUs 22. Each server of servers 12 may represent a real or virtual server that hosts and executes software that implements DUs 22. Such software may include one or more applications deployed as, e.g., virtual machine or containers, to servers 12. While not illustrated in FIG. 1, CUs 13 may also be executed by servers. A combination of DUs 22, the midhaul network, CUs 13, and the backhaul network may effectively implement an IP-based transport network between the RUs 14 and mobile core network 7.

DUs 22 and CUs 13 are considered "intermediate network devices" of RAN 9, in that DUs 22 and CUs 13 transport mobile data traffic and control traffic between RUs 14 and mobile core network 7. In other examples of RANs 9, intermediate network devices may include serving gateways (SGWs) or other types of intermediate network devices for different types of RANs, e.g., 4G/LTE, different types of intermediate network devices for non-O-RAN 5G networks, or other intermediate network devices. Likewise, RUs 14 are not limited to O-RAN radio units but may represent gNodeBs, eNodeBs, other NodeBs, or other type of base station that implements cellular radio units for a RAN.

Aspects of RANs 9 and/or mobile core network 7 may be managed and/or monitored by SMO 112, non-RT RIC 122, and near-RT RIC 124. In some examples, SMO 112, non-RT RIC 122, and near-RT RIC 124 may be operated by a mobile network operator providing 5G services to a tenant. SMO 112 can orchestrate and control management and automation aspects of RANs 109 (e.g., network slicing, management, and orchestration of O-Cloud, etc.). Further, SMO 112 may control aspects of non-RT RIC 122 and near-RT RIC 124. Non-RT RIC 122 can provide non-real-time (e.g., greater than one second) control and optimization of RAN elements and resources such as RUs, DUs, and CUs, workflow management, and policy-based control of applications and features of near-RT RIC 124. Near-RT RIC 124 can provide near-real-time (e.g., milliseconds) control and optimization of RAN elements and resources via fine-grained data collection and actions. Non-RT RIC 122 and near-RT RIC 124 may deploy as a highly scalable, microservices based containerized architecture. In some examples, near-RT RIC 124 may be located within an edge or regional cloud.

Non-RT RIC 122 may onboard one or more applications, e.g., applications 123 that manage non-real time events within non-RT RIC 122, such as applications that do not require response times of less than one second. Applications 123 may leverage functionality exposed via the non-RT RIC framework of non-RT RIC 122. Applications 123 may be used to control and manage RAN elements and resources, such as near-RT RIC 124, RAN nodes, and/or resources in the O-RAN cloud. Applications 123 may also utilize network data, performance metrics, and subscriber data to provide recommendations for network optimization and operational guidance (e.g., policies) to one or more applications of near-RT RIC 124. Near-RT RIC 124 may onboard one or more applications, e.g., applications 125 that manage near-real time events within near-RT RIC 124. Applications 125 may leverage the functionality exposed via the near-RT RIC framework of near-RT RIC 124. Near-RT RIC 124 may enforce policies received from applications 123 of non-RT RIC 122 and may provide policy feedback to non-RT RIC 122. Although illustrated as within non-RT RIC 122, any one or more of applications 123 may be executed by a third party, separate from non-RT RIC 122. Likewise, although illustrated as within near-RT RIC 124, any one or more of applications 125 may be executed by a third party, separate from near-RT RIC 124.

It may be beneficial for mobile network system 2 to decrease an amount of energy consumed by one or more devices within radio access networks 9. For example, when a device within RANs 9 is continuously active and drawing power, the device may consume a greater amount of energy as compared to when the device is not active, or is operating at a decreased level of activity. In some examples, one or more devices within RANs 9 may be active when operating as part of an active route connecting one or more UEs of UEs 4 with mobile core network 7. But when a device within RANs 9 is not part of an active route connecting one or more UEs of UEs 4 with mobile core network 7, mobile network system 2 may decrease an amount of energy consumed by devices of RANs 9 by transitioning the device to an inactive state, or a state of decreased activity.

In some examples, each unit of CUs 13, RUs 14, and DUs 22 may operate according to a hibernation mode or operate according to an active mode. For example, RU 14B may operate according to the hibernation mode or operate according to the active mode, DU 22A may operate according to the hibernation mode or operate according to the active mode, and CU 13B may operate according to the hibernation mode or operate according to the active mode. Any unit of CUs 13, RUs 14, and DUs 22 may operate according to the hibernation mode or operate according to the active mode. A device operating in the hibernation mode may consume a lower amount of energy as compared with a device operating in the active mode. This means that transitioning one or more units of CUs 13, RUs 14, and DUs 22 to the hibernation mode may decrease an amount of energy consumed by RANs 9.

When operating according to the hibernation mode, a device may deactivate during a sequence of sleep phases and activate during a sequence of wake-up phases. The sleep phases may be at least partially interleaved with the wake-up phases so that a wake-up phase occurs between each pair of consecutive sleep phases of the sleep phases. A device may consume energy at a greater rate per unit time during wake-up phases as compared with energy consumption per unit time during sleep phases. A device operating according to the hibernation mode may alternate between sleep phases and wake-up phases so that during the sleep phases, the device consumes energy at a low rate and thus decreases an amount of energy consumed by RANs 9 as compared with when the device continuously operates in the active node.

In some examples when a device operating in the hibernation mode alternates between wake-up phases and sleep phases, a duration of each wake-up phase of a sequence of wake-up phases is shorter than a duration of each sleep phase of a plurality of sleep phases. This is because mobile network system 2 may seek to conserve power by causing devices to operate according to the hibernation mode, and the system may conserve more power for sleep phases to be longer than wake-up phases as compared with an amount of power conserved when wake-up phases are longer than sleep phases. In some examples, a device operating in the hibernation mode may be configured to communicate with other devices during wake-up phases but might not be configured to communicate with other devices during sleep phases.

A first device operating in the active mode may communicate with a second device operating in the hibernation mode by outputting one or more messages to the second device. A message may in some cases arrive at the second device when the second device is in a sleep phase, and the message may include instructions for the second device to perform one or more actions once it transitions to a wake-up phase. For example, RU 14C may output a message to RU 14B via communication link 50 when RU 14B is operating according to the hibernation mode. Communication link 50 may be a radio link between RUs 14C and RU 14B and, in such cases, communication link 50 allows RUs 14C and RU 14B to communicate without involvement by an intermediate network device such as any of DUs 22A, 22B or CU 13A. In some examples, the message may include an instruction for RU 14B to reply with an indication of whether RU 14B is transitioning to the active mode when RU 14B enters the wake-up phase. Additionally, or alternatively, hibernation manager 121 may output a message to DU 22A, the message instructing DU 22A to transition from the hibernation mode to the active mode. In some examples, the message may arrive at DU 22A when DU 22A is in a sleep phase, and may instruct DU 22A to remain active without transitioning back to a sleep phase once DU 22A transitions to a wake-up phase from a sleep phase.

When operating according to the active mode, a device may be continuously active without transitioning between sleep phases and wake-up phases. A device may operate according to the active mode when the device is part of an active route connecting one or more UEs with mobile core network 7. For example, when DU 22B is part of an active route connecting one or more UEs of UEs 4 with mobile core network 7, DU 22B may operate according to the active mode so that DU 22B may continuously handle network traffic between the one or more UEs and mobile core network 7. When DU 22B operates according to the hibernation mode, DU 22B might not be configured to continuously handle network traffic between the one or more UEs and mobile core network 7. This means that when there is an active route between one or more UEs and mobile core network 7 via DU 22B, it may be beneficial for DU 22B to operate according to the active mode so that the one or more UEs receive service without interruption.

In some examples, hibernation manager 121 of non-RT RIC 122 may control whether one or more units of CUs 13, RUs 14, and DUs 22 operate according to the hibernation mode or operate according to the active mode. Hibernation manager 121 may control whether a device operates according to the hibernation mode or the active mode based on determining whether the device is part of an active route through RANs 9 or will in the near future be part of an active route through RANs 9. In some examples, hibernation manager 121 may solicit and/or receive information concerning the active or hibernation status of one or more units of CUs 13, RUs 14, and DUs 22 via active routes through RANs 9. Based on this information, hibernation manager 121 may determine whether to cause one or more intermediate network devices (e.g., one or more of CUs 13 and DUs 22) to transition from the hibernation mode to the active mode or to cause one or more intermediate network devices to transition from the active mode to the hibernation mode.

To cause an intermediate network device to transition from the hibernation mode to the active mode, hibernation manager 121 may output a message instructing the intermediate network device to remain active without transitioning to a sleep phase. For example, when the intermediate network device receives the message when the intermediate network device is in a sleep phase, the intermediate device may remain active the next time that the intermediate network device transitions from the sleep phase to a wake-up phase without transitioning back to the sleep phase. When the intermediate network device receives the message when the intermediate network device is in a wake-up phase, the intermediate device may remain active without transitioning to a sleep phase.

In some examples, each RU of RUs 14 may control whether the RU is operating according to the hibernation mode or operating according to the active mode without instruction from hibernation manager 121. For example, RU 14B may determine to transition from the hibernation mode to the active mode based on one or more UEs of UEs 4 seeking to connect to mobile core network 7 via RU 14B. Additionally, or alternatively, RU 14B may transition from the active mode to the hibernation mode based on UEs 4 not seeking to connect for more than a threshold amount of time.

Hibernation manager 121 may, in some examples, instruct, RU 14C to discover whether RU 14B is transitioning from the hibernation mode to the active mode. For example, an active route may exist through RANs 9 through RU 14C, DU 22B, and CU 13B such that each of RU 14C, DU 22B, and CU 13B operate in the active mode. This means that hibernation manager 121 may communicate with RU 14C via CU 13B and DU 22B. In some examples, CU 13A and/or DU 22A may operate in the hibernation mode such that hibernation manager 121 is not able to communicate with RU 14B via CU 13A and DU 22A.

RU 14C may be configured to communicate with RU 14B via communication link 50, even when RU 14B is operating in the hibernation mode and hibernation manager 121 is not able to communicate with RU 14B via CU 13A and DU 22A. This means that hibernation manager 121 may receive information from RU 14B by instructing, via the active route via CU 13B and DU 22B, RU 14C to request the information from RU 14B via communication link 50. For example, hibernation manager 121 may output a request for RU 14C to discover whether RU 14B is transitioning from the hibernation mode to the active mode. In some examples, RU 14B may transition from the hibernation mode to the active mode based on determining that one or more UEs of UEs 4 are seeking to connect with mobile core network 7 via RU 14B. For one or more UEs of UEs 4 to connect with mobile core network 7 via RU 14B, it may be necessary for an active route to exist between the one or more UEs and mobile core network 7 via RU 14B. For an active route to exist between the one or more UEs and mobile core network 7 via RU 14B, it may be necessary for RU 14B to operate according to the active mode so that RU 14B is able to continuously handle network traffic between the one or more UEs and mobile core network 7.

Hibernation manager 121 may receive, from RU 14C via DU 22B and CU 13B, information indicating that RU 14B is transitioning from the hibernation mode to the active mode. Since an active route exists through RANs 9 via RU 14C, DU 22B, and CU 13B, hibernation manager 121 may communicate with RU 14C via this active route. In some examples, an active route might not exist through RANs 9 via RU 14B, DU 22A, and CU 13A. Hibernation manager 121 may cause, based on receiving the information that RU 14B is transitioning from the hibernation mode to the active mode, DU 22A to transition from the hibernation mode to the active mode so that an active route exists through RANs 9 via RU 14B, DU 22A, and CU 13A.

In some examples, to cause DU 22A to transition from the hibernation mode to the active mode, hibernation manager 121 may output an instruction for DU 22A to remain active when DU 22A transitions from a sleep phase to a wake-up phase without transitioning back to a sleep phase. In some examples, hibernation manager 121 may output the instruction to DU 22A via CU 13A. In some examples, when hibernation manager 121 outputs the instruction to DU 22A via CU 13A, CU 13A is operating according to the active mode. In some examples, hibernation manager 121 may cause CU 13A to transition from the hibernation mode to the active mode based on receiving the information that RU 14B is transitioning from the hibernation mode to the active mode.

Hibernation manager 121 may instruct, via CU 13B and DU 22B, RU 14D to discover whether RU 14E is transitioning from the hibernation mode to the active mode. For example, an active route may exist through RANs 9 via RU 14D, DU 22B, and CU 13B such that each of RU 14D, DU 22B, and CU 13B operate in the active mode. In some examples, RU 14D operates in the hibernation mode but DU 22B and CU 13B operate in the active mode. In either case, hibernation manager 121 may communicate with RU 14D via CU 13B and DU 22B. In some examples, DU 22C may operate in the hibernation mode such that hibernation manager 121 is not able to communicate with RU 14E via CU 13B and DU 22C. To discover whether RU 14E is transitioning from the hibernation mode to the active mode, RU 14D may communicate with RU 14E via communication link 52. Communication link 52 may be a radio link between RUs 14D and RU 14E and, in such cases, communication link 52 allows RUs 14D and RU 14E to communicate without involvement by an intermediate network device such as any of DUs 22B, 22C or CU 13B.

In some examples, hibernation manager 121 may be configured to receive, via DU 22B and CU 13B based on instructing RU 14D to discover whether RU 14E is transitioning from the hibernation mode to the active mode, information indicating that RU 14E is transitioning from the hibernation mode to the active mode. Hibernation manager 121 may cause DU 22C to transition from the hibernation mode to the active node so that an active route connects RU 14E to mobile core network 7 via DU 22C and CU 13B. That is, hibernation manager 121 may cause DU 22C to transition from the hibernation mode to the active mode based on determining that RU 14E is transitioning from the hibernation mode to the active mode. This may allow RU 14E, DU 22C, and CU 13B to form an active route through RANs 9 to connect one or more UEs of UEs 4 with mobile core network.

Hibernation manager 121 may be configured to receive, via DU 22C and CU 13B based on instructing RU 14D to discover whether RU 14E is transitioning from the hibernation mode to the active mode, information indicating that RU 14E is remaining in hibernation mode without transitioning to the active mode. In some examples, RU 14E may remain in the hibernation mode without transitioning to the active mode when UEs 4 do not seek to connect to mobile core network 7 via RU 14E. When RU 14E is not needed to participate in an active route through RANs 9, RU 14E may remain in the hibernation mode to decrease an amount of energy consumed by devices of RANs 9 as compared with energy consumption when RU 14E is operating in the active mode.

Hibernation manager 121 may cause DU 22C to remain in the hibernation mode based on receiving information indicating that RU 14E is remaining in hibernation mode without transitioning to the active mode. When RU 14E remains in the hibernation mode without transitioning to the active mode, it may be beneficial for DU 22C to also remain in the hibernation mode to conserve energy. This is because RU 14E might not be able to connect one or more UEs of UEs 4 to mobile core network 7 via DU 22C when RU 14E is operating in the hibernation mode such that it would be a waste of energy for DU 22C to operate in the active mode.

Mobile network system 2 is not limited to RU 14B and RU 14C communicating via communication link 50 and RU 14D and RU 14E communicating via communication link 52. Each RU of RUs 14 may be configured to communicate with one or more other RUs of RUs 14 via a wireless communication link, even when one of the communicating RUs is operating in the hibernation mode. For example, RU 14A may be configured to communicate with RU 14B via a wireless communication link. This may allow hibernation manager 121 to obtain information corresponding to one or more RUs of RUs 14 that are not connected to an active route through RANs 9 via one or more RUs of RUs 14 that are connected to an active route through RANs 9. Based on this information, hibernation manager 121 may determine whether to transition one or more devices to create additional active routes.

In some examples, hibernation manager 121 may store information indicating a topology of RANs 9. For example, the topology may indicate that RU 14A and RU 14B are connected to DU 22A, DU 22 is connected to CU 13A, RU 14C and RU 14C are connected to DU 22B, and so on. This may allow hibernation manager 121 to identify one or more pathways for communication within RANs 9. For example, when the information indicates that CU 3B is connected to DU 22B and DU 22B is connected to RU 14C, and hibernation manager 121 identifies that CU 12B and DU 22B are part of an active route, hibernation manager 121 may identify that it is possible to communicate with RU 14C via the active route.

Hibernation manager 121 may be implemented as a controller or component of a controller, such as non-RT RIC 122 (as shown) or as one of applications 123, as part of near-RT RIC 124 or as one of applications 125, as another component of SMO 112, or as part of a separate controller.

Figure 2:
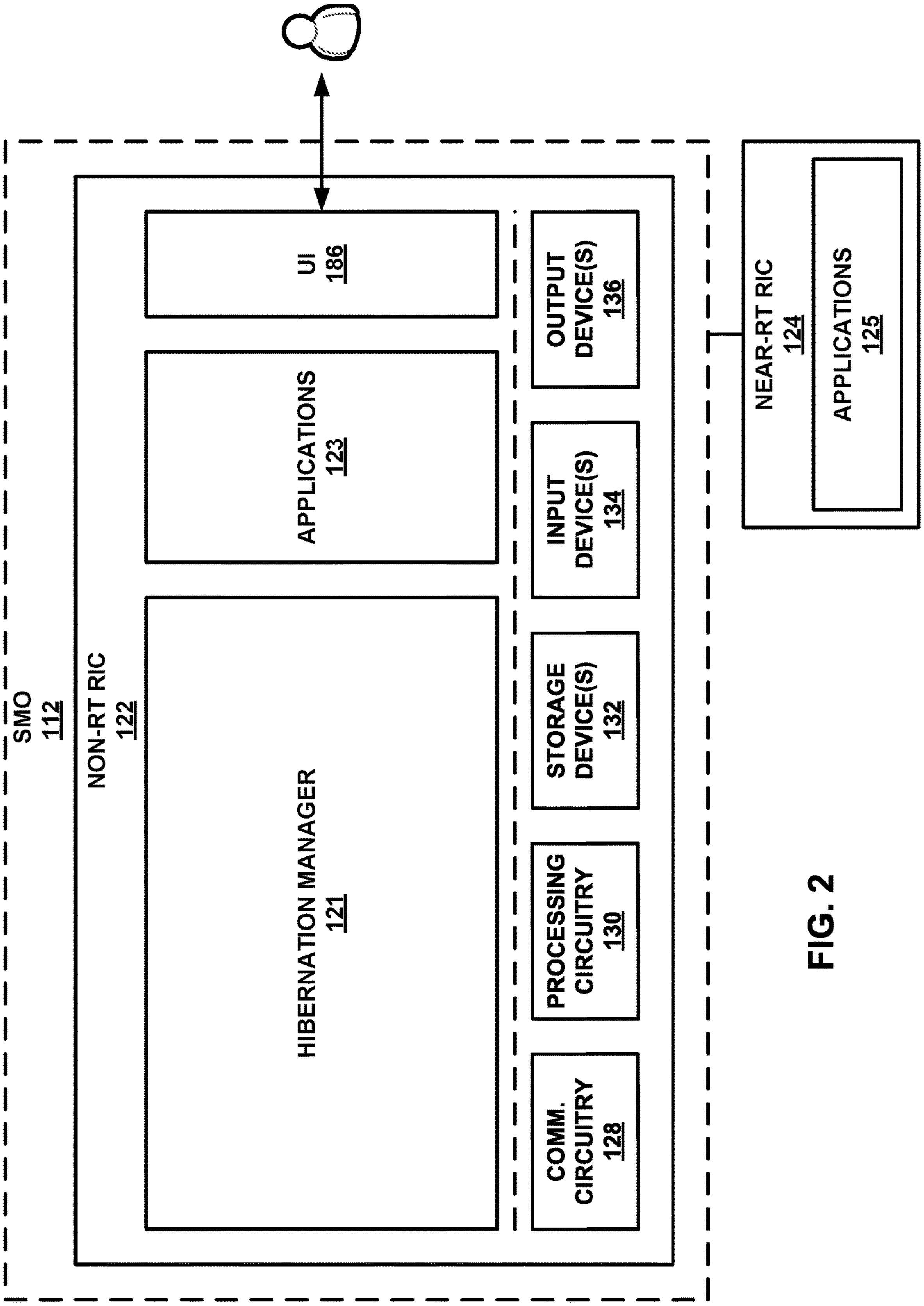
FIG. 2 is a block diagram illustrating an example Service and Management Orchestrator (SMO) including a non-real time Radio Access Network Intelligent Controller (non-RT RIC), and an example near-RT RIC, in accordance with one or more techniques of this disclosure.

FIG. 2 is a block diagram illustrating an example SMO 112 including a non-RT RIC 122, and an example near-RT RIC 124, in accordance with one or more techniques of this disclosure. As seen in FIG. 2, Non-RT RIC 122 may include hibernation manager 121 and applications 123, and near-RT RIC 124 includes applications 125. Non-RT RIC 122 may also include communication circuitry 128, processing circuitry 130, storage device(s) 132, input device(s) 134, output device(s) 136. Non-RT RIC 122 may also include user interface (UI) module 186. Hibernation manager 121 may represent one of applications 123. In some examples, near-RT RIC 124 includes hibernation manager 121, and hibernation manager 121 may represent one of applications 125. In some examples, hibernation manager 121 is a different SMO 112 application or executed by another controller.

In some examples, non-RT RIC 122 and/or near-RT RIC 124 are implemented with a cloud computing system, server farm, and/or server cluster (or portion thereof) that provides services to client devices and other devices or systems. In other examples, non-RT RIC 122 and/or near-RT RIC 124 may be implemented through one or more virtualized compute instances (e.g., virtual machines, containers) of a data center, cloud computing system, server farm, and/or server cluster. One or more of the devices, modules, storage areas, or other components of non-RT RIC 122 and near-RT RIC 124 may be interconnected to enable inter-component communications (physically, communicatively, and/or operatively). In some examples, such connectivity may be provided by communication channels, a system bus, a network connection, an inter-process communication data structure, or any other method for communicating data.

Applications 123 may manage non-real time events within non-RT RIC 122, such as applications that do not require response times of less than one second. Applications 123 may leverage the functionality exposed via a non-RT RIC framework. Applications 123 may be used to control and manage RAN elements and resources, such as a near-RT RIC, RAN nodes, and/or resources in the O-RAN cloud. Applications 123 may provide one or more services that are performed using interfaces of non-RT RIC 122. For example, applications 123 may include services such as policies for a near-RT RIC, configuration instructions for O-RAN managed elements, performance jobs for O-RAN managed elements, services for managing the services and/or data, or any combination thereof.

Communication circuitry 128 may communicate with devices external to non-RT RIC 122 by transmitting and/or receiving data, and may operate, in some respects, as both an input device and an output device. In some examples, communication circuitry 128 may communicate with other devices over a network. In other examples, communication circuitry 128 may send and/or receive radio signals on a radio network such as a cellular radio network. In other examples, communication circuitry 128 may transmit and/or receive satellite signals on a satellite network such as a Global Positioning System (GPS) network. Examples of communication circuitry 128 include a network interface card (e.g., an Ethernet card), an optical transceiver, a radio frequency transceiver, a GPS receiver, or any other type of device that can send and/or receive information. Other examples of communication circuitry 128 may include devices capable of communicating over Bluetooth®, GPS, near field communication (NFC), ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

Processing circuitry 130 may implement functionality and/or execute instructions associated with management of non-RT RIC 122 or associated with one or more modules illustrated herein and/or described herein, including applications 123 and hibernation manager 121. Processing circuitry 130 may be, may be part of, and/or may include processing circuitry that performs operations in accordance with one or more aspects of the present disclosure. Examples of processing circuitry 130 include microprocessors, application processors, display controllers, auxiliary processors, one or more sensor hubs, and any other hardware configured to function as a processor, a processing unit, or a processing device. Non-RT RIC 122 may use processing circuitry 130 to perform operations in accordance with one or more aspects of the present disclosure using software, hardware, firmware, or a mixture of hardware, software, and firmware residing in and/or executing at non-RT RIC 122. Any one or more of hibernation manager 121 and applications 123 may be hosted by a cloud provider or other third-party.

In some examples, processing circuitry 130 may include any one or more of a microprocessor, a controller, a digital signal processor (DSP), graphics processing unit (GPU), tensor processing unit (TPU), an application specific integrated circuit (ASIC), a field-programmable gate array (FPGA), or equivalent discrete or analog logic circuitry. In some examples, processing circuitry 130 may include multiple components, such as any combination of one or more microprocessors, one or more controllers, one or more DSPs, GPUs, TPUs, one or more ASICs, or one or more FPGAs, as well as other discrete or integrated logic circuitry, which may be physically located in one or more devices in one or more physical locations.

Storage device(s) 132 may store information for processing during operation of non-RT RIC 122. Storage device(s) 132 may store program instructions and/or data associated with one or more of the modules described in accordance with one or more aspects of this disclosure. Processing circuitry 130 and storage device(s) 132 may provide an operating environment or platform for such modules, which may be implemented as software, but may in some examples include any combination of hardware, firmware, and software. Processing circuitry 130 may execute instructions and storage device(s) 132 may store instructions and/or data of one or more modules. The combination of processing circuitry 130 and storage device(s) 132 may retrieve, store, and/or execute the instructions and/or data of one or more applications, modules, or software. Processing circuitry 130 and/or storage device(s) 132 may also be operably coupled to one or more other software and/or hardware components, including, but not limited to, one or more of the components of non-RT RIC 122 and/or one or more devices or systems illustrated as being connected to non-RT RIC 122.

In some examples, one or more of storage device(s) 132 are temporary memories, meaning that a primary purpose is not long-term storage. Storage device(s) 132 may be configured for short-term storage of information as volatile memory and therefore not retain stored contents if deactivated. Examples of volatile memories include random access memories (RAM), read-only memory (ROM), dynamic random-access memories (DRAM), static random-access memories (SRAM), and other forms of volatile memories known in the art. Storage device(s) 132, in some examples, also include one or more computer-readable storage media. Storage device(s) 132 may be configured to store larger amounts of information than volatile memory. Storage device(s) 132 may further be configured for long-term storage of information as non-volatile memory space and retain information after activate/off cycles. Examples of non-volatile memories include magnetic hard disks, optical discs, flash memories, or forms of non-volatile RAM (NVRAM), electrically programmable memories (EPROM), or electrically erasable and programmable (EEPROM) memories.

Input device(s) 134 may represent any input devices of non-RT RIC 122 not otherwise separately described herein. One or more input device(s) 134 may generate, receive, and/or process input from any type of device capable of detecting input from a human or machine. For example, input device(s) 134 may generate, receive, and/or process input in the form of electrical, physical, audio, image, and/or visual input (e.g., peripheral device, keyboard, microphone, camera).

Output device(s) 136 may represent any output devices of non-RT RIC 122 not otherwise separately described herein. One or more output device(s) 136 may generate, receive, and/or process input from any type of device capable of detecting input from a human or machine. For example, output device(s) 136 may generate, receive, and/or process output in the form of electrical and/or physical output (e.g., peripheral device, actuator).

Non-RT RIC 122 includes hibernation manager 121. In some examples, hibernation manager 121 may be configured to determine whether to transition one or more devices of RANs 9 of FIG. 1 from a hibernation mode to an active mode and/or whether to transition one or more devices of RANs 9 from the active mode to the hibernation mode. In some examples, devices of RANs 9 include CUs 13, RUs 14, servers 12 including DUs 22, one or more other devices, or any combination thereof, and In some examples, each device of a plurality of devices of RANs 9 may operate according to a hibernation mode or operate according to an active mode. In the hibernation mode, a device may transition between sleep phases and wake-up phases. The device may consume energy at a lower rate per unit time during the sleep phases than the rate at which the device consumes energy during the wake-up phases. This is because the device may be active and configured to communicate during the wake-up phases, but inactive and unable to communicate during the sleep phases.

In some examples, one or more active routes may exist through RANs 9 via the plurality of devices. For example, an active route may connect one or more UEs of UEs 4 to mobile core network 7 via RU 14C, DU 22B of server 12B, and CU 13B. Each device that is part of an active route may operate in the active mode and might not operate in the hibernation mode For example, when an active route includes RU 14C, DU 22B, and CU 13B, each of RU 14C, DU 22B, and CU 13B may operate in the active mode so that RU 14C, DU 22B, and CU 13B may form the active route such that one or more UEs of UEs 4 may exchange information with mobile core network 7 via the active route.

In some examples, a route through RANs 9 may be inactive when one or more devices along the route operate in the hibernation mode. For example, a route may exist through RANs 9 via RU 14B, DU 22A of server 12A, and CU 13A. Based on one or more of RU 14B, DU 22A, and CU 13A operating in the hibernation mode, the route through RU 14B, DU 22A, and CU 13A may be inactive. For example, based on DU 22A operating in the hibernation mode, the route through RU 14B, DU 22A, and CU 13A may be inactive even when RU 14B and/or CU 13A operates in the active mode.

In some examples, hibernation manager 121 may cause one or more routes through RANs 9 to become inactive. For example, hibernation manager 121 may cause DU 22C to transition from the active mode to the hibernation mode, thus causing a route through RU 14E, DU 22C, and CU 13B to become inactive. Additionally, or alternatively, hibernation manager 121 may cause CU 13B to transition from the active mode to the hibernation mode, thus causing a route through RU 14E, DU 22C, and CU 13B to become inactive. In any case, hibernation manager 121 may cause the route through RU 14E, DU 22C, and CU 13B to become inactive based on the route not being used to connect one or more UEs of UEs 4 with mobile core network 7. For example, when the route is unused or lightly used for at least a predetermined amount of time, hibernation manager 121 may cause the route to become inactive.

Hibernation manager 121 may cause one or more routes through RANs 9 to become inactive to conserve energy. For example, devices of RANs 9 may consume a greater amount of energy when operating in the active mode as compared with an amount of energy that the devices consume when operating in the hibernation mode. When a route is unused or lightly used, hibernation manager 121 may transition one or more devices along the route to the hibernation mode to conserve energy. In some examples, one or more devices within RANs 9 may transition to the hibernation mode themselves without instruction from hibernation manager 121 or another device. For example, a device may transition to the hibernation mode based on determining that an amount of network traffic traveling through the device is below a threshold amount of traffic for more than a threshold amount of time.

Hibernation manager 121 may determine whether to cause one or more devices within RANs 9 to transition from an active mode to a hibernation mode and/or whether to cause one or more devices within RANs 9 to transition from the hibernation mode to the active mode. For example, hibernation manager 121 may instruct, via a first DU operating in an active mode, a first RU to discover whether a second RU operating in a hibernation mode is transitioning to the active mode. For example, hibernation manager 121 may instruct RU 14C to discover whether RU 14B is transitioning from the hibernation mode to the active mode. In some examples, RU 14C is part of an active route through RANs 9 via DU 22B and CU 13B and RU 14B is part of an inactive route through RANs 9 via DU 22A and CU 13A. This means that hibernation manager 121 may be configured to communicate with RU 14C via the active route but might not be able to communicate with RU 14B via the inactive route. By instructing RU 14C to communicate with RU 14B via communication link 50, hibernation manager 121 may be configured to discover information corresponding to RU 14B even when RU 14B, DU 22A, CU 13A, or any combination thereof are operating in the hibernation mode.

Hibernation manager 121 may receive, via a first RU and a first DU, information indicating that a second RU is transitioning from the hibernation mode to the active mode. An active route may connect the first RU to mobile core network 7 via the first DU, and an inactive route may connect the second RU to the mobile core network 7 via a second DU. Hibernation manager 121 may cause, based on receiving the information indicating that the second RU is transitioning to the active mode, a second DU to transition from the hibernation mode to the active mode so that an active route connects the second RU to mobile core network 7 via the second DU.

For example, hibernation manager 121 may receive, from RU 14C via DU 22B and CU 13B, information indicating that RU 14B is transitioning from the hibernation mode to the active mode. Based on receiving the information indicating that RU 14B is transitioning from the hibernation mode to the active mode, hibernation manager 121 may determine to create an active route through RU 14B, DU 22A, and CU 13A. This is because RU 14B may transition from the hibernation mode to the active mode when one or more UEs of UEs 4 attempts to connect to mobile core network 7 via RU 14B. For one or more UEs of UEs 4 to connect to mobile core network 7 via RU 14B, it may be necessary for an active route to exist through RU 14B, DU 22A, and CU 13A. Hibernation manager 121 may cause DU 22A to transition from the hibernation mode to the active mode to create an active route through RU 14B, DU 22A, and CU 13A. Additionally, or alternatively, hibernation manager 121 may cause CU 13A to transition from the hibernation mode to the active mode to create the active route through RU 14B, DU 22A, and CU 13A.

In some examples, hibernation manager 121 may instruct, via a first DU, a third RU to discover whether a fourth RU operating in the hibernation mode is transitioning from the hibernation mode to the active mode. An active route may connect the third RU to mobile core network 7 via the first DU, and an inactive route may connect the fourth RU to the mobile core network 7 via a third DU. Hibernation manager 121 may receive, via the third RU and the first DU, information indicating that the fourth RU is remaining in the hibernation mode. In response to receiving the information indicating that the fourth RU is remaining in the hibernation mode, hibernation manager 121 may cause the third DU to remain in the hibernation mode. Because hibernation manager 121 is able to obtain mode information from the fourth RU via a different route that does not include the third DU that is on a route from the fourth RU to the core network, hibernation manager 121 can avoid waking up the third DU in order to communicate with the fourth RU, thereby reducing an amount of power required for operating RANs 9.

For example, hibernation manager 121 may instruct, via a DU 22B, RU 14D to discover whether RU 14E is transitioning from the hibernation mode to the active mode. An active route may connect RU 14D to mobile core network 7 via DU 22B and CU 13B, and an inactive route may connect DU 22C to the mobile core network 7 via DU 22C and CU 13B. Hibernation manager 121 may receive, via RU 14D and DU 22B, information indicating that RU 14E is remaining in the hibernation mode. In response to receiving the information indicating that RU 14E is remaining in the hibernation mode, hibernation manager 121 may cause the DU 22C to remain in the hibernation mode. Because hibernation manager 121 is able to obtain mode information from RU 14E via a different route that does not include the DU 22C that is on a route from the RU 14E to the core network, hibernation manager 121 can avoid waking up DU 22C in order to communicate with the RU 14E, thereby reducing an amount of power required for operating RANs 9.

In some examples, a user may provide user input via UI module 186. UI module 186 can generate data indicative of various user interface screens that graphically depict information corresponding to RANs 9. UI module 786 can also output, for display, data indicative of graphical user interface elements that solicit input.

Figure 3:
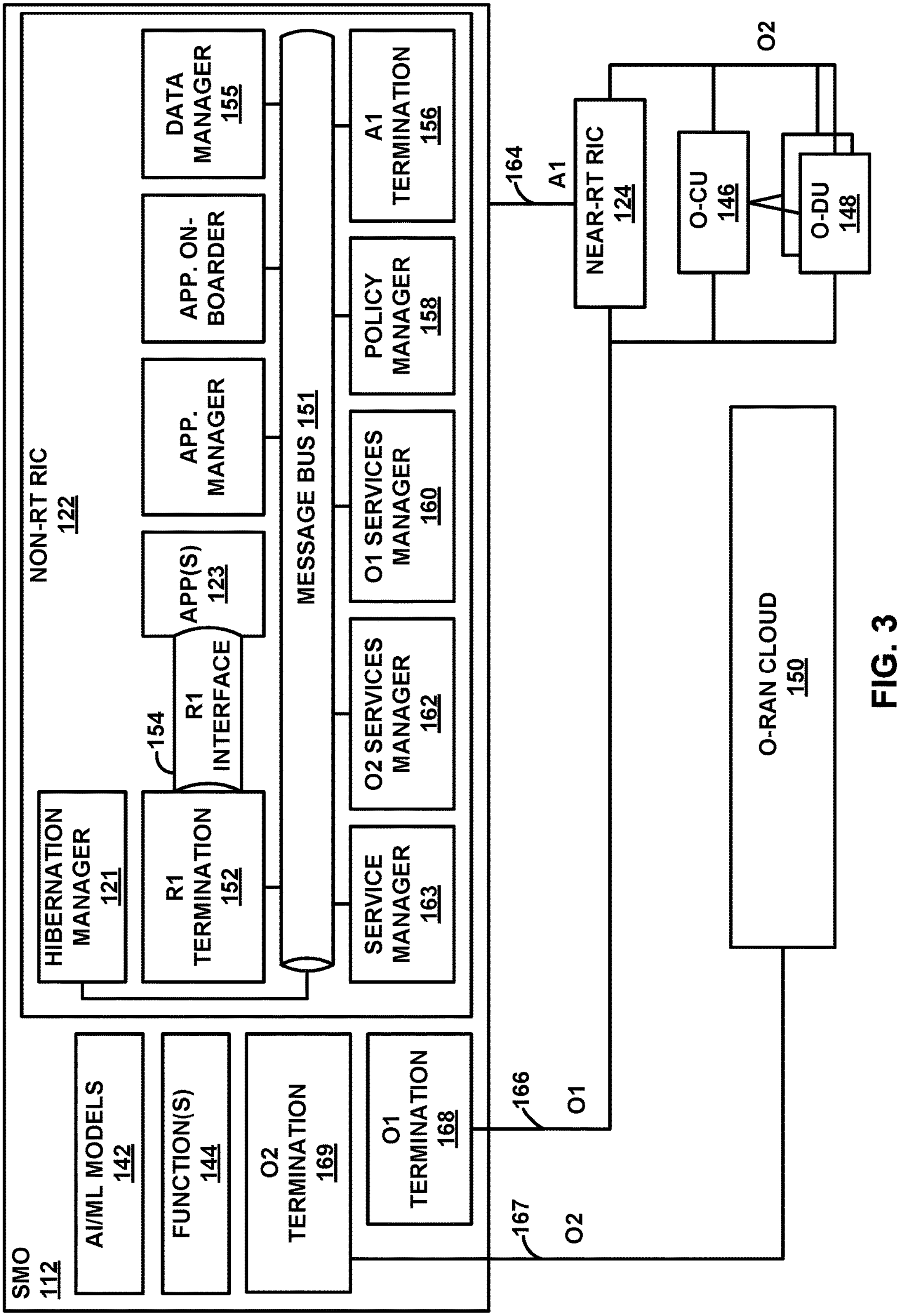
FIG. 3 is a block diagram illustrating another example SMO including a non-RT RIC, and an example near-RT RIC, in accordance with one or more techniques of this disclosure.

FIG. 3 is a block diagram illustrating another example SMO 112 including a non-RT RIC 122, and an example near-RT RIC 124, in accordance with one or more techniques of this disclosure. In the example illustrated in FIG. 3, SMO 112 may include non-RT RIC 122, one or more AI/ML models 142, one or more functions 144 (e.g., NSSMF, NFMF, and other functions), and open interfaces, such as O1 termination interface 168 and O2 termination interface 169. SMO 112 may manage non-RT RIC 122, near-RT RIC 124, O-RAN managed elements (e.g., O-RAN centralized unit (O-CU) 146, O-RAN decentralized unit (O-DU) 148 of one or more base stations), and resources in O-RAN cloud 150.

Non-RT RIC 122 may be deployed as a highly scalable, microservices based containerized architecture. In this example, non-RT RIC 122 may onboard, deploy, and/or terminate applications 123. Applications 123 may represent applications that leverage the functionality exposed via the framework of non-RT RIC 122. Applications 123 may provide non-RT RIC 122 with non-real time (e.g., greater than one second) control of RAN elements and their resources. Applications 123 may provide services for radio resource management, higher layer procedure optimization, policy optimization, and providing guidance, parameters, policies, and AI/ML models to support the operation of RAN functions.

For example, applications 123 may provide A1 services that provide and facilitate RAN operations and optimization of near-RT RIC 124, such as providing operational guidance (e.g., policies), enrichment information (e.g., forecasts), and AI/ML services. A1 services may include policy management services such as creating, updating, and/or deleting of A1 policies; receiving policy feedback; querying policy types, identifiers, and status; defining which policy types are supported by near-RT RIC 124; and registering applications (xApps) of near-RT RIC 124 to specific policy types. A1 services may include enrichment information services, such as providing data for model training of AI/ML models, such as forecasts and/or data analytics.

Applications 123 may provide O1 services that provide configuration management or performance management of O-RAN managed entities, such as near-RT RIC 124 and/or RAN nodes, e.g., O-CU 146, O-DU 148 (also referred to herein as "E2 nodes"). O1 services may provide configuration management services to create, update, and/or delete configurations to O-RAN managed entities. For example, configuration management services may include provisioning operations (e.g., for NSS and NF provisioning) to create a managed object instance (MOI), obtain MOI attributes, modify MOI attributes, and/or delete the MOI. O1 services may also provide performance management services that monitor the status of elements or components in the O-RAN managed entities. For example, non-RT RIC 122 may create, modify, or delete performance management jobs to send heartbeat messages to monitor the status and/or availability of services of RAN nodes or to send trace messages to monitor link failures. O1 services may also provide file management, such as to push files to the RAN nodes (e.g., software updates, beamforming configuration files, ML models, security certificates, etc.).

Applications 123 may provide O2 services that provide infrastructure management and/or network function deployment of resources in O-RAN cloud 150 (also referred to herein as "O-Cloud 150"). O2 services may provide discovery and administration of O-Cloud resources; Scale-In, Scale-Out of cloud/deployments (e.g., deploying resources with more or less processors); FCAPS of cloud/deployments, software management of cloud platform/deployments; create/delete deployment and associated allocated O-Cloud resources.

Applications 123 may provide service management and exposure (SME) services, data management and exposure (DME) services, and/or other services. SME services may provide services that enable services provided over an internal interface (R1 interface 154) of non-RT RIC 122 and their exposure and extensibility through services including bootstrap, service registration/deregistration or updates to service registration, service discovery or notification, heartbeat, authentication, authorization, etc. Data management and exposure (DME) services may include services that manage data and their exposure between applications 123. For example, applications 123 may have different functions, such as application 123A configured to collect and analyze data, application 123B configured to generate an ML model based on the results of the analysis, and application 123N configured to make a prediction or inference using the ML model and/or to generate controls for RAN nodes based on the prediction or inference. DME services may manage the data shared between applications 123, such as the collection of data, the processing of the data, and/or the advertisement of the data.

Non-RT RIC 122 may include one or more managers to process the A1, O1, O2, SME, DME services, and other services. For example, non-RT RIC 122 may include a policy manager 158, performance manager 160, configuration manager 162, service manager 163, data manager 155, and hibernation manager 121. Non-RT RIC 122 may include other managers, such as an application manager and an application on-boarder, that are configured to manage the installation and deployment of applications 123.

Policy manager 158 is configured to control the deployment of policies (e.g., A1 services). For example, in response to receiving requests for A1 services from applications 123 via R1 interface 154, R1 interface 154 sends the requests to policy manager 158 via message bus 151. Policy manager 158 may process the A1 services and may send the A1 services to A1 termination 156 via message bus 151, which provides the A1 services to near-RT RIC 124 via A1 interface 164. In some examples, the A1 interface may implement an A1AP application protocol based on the 3GPP framework.

Performance manager 160 is configured to control the deployment of O1 services for monitoring the performance of near-RT RIC 124 and/or RAN nodes (e.g., O-CU 146, O-DU 148). For example, in response to receiving requests for O1 services for monitoring the performance of near-RT RIC 124 from applications 123 via R1 interface 154, R1 interface 154 sends the requests to performance manager 160 via message bus 151. Performance manager 160 may process the O1 services and may send the O1 services to O1 termination interface 168, which provides the O1 services to near-RT RIC 124 via O1 interface 166. In some examples, the O1 interface may implement REST/HTTPS APIs and/or NETCONF. Performance manager 160 may also be configured to control the deployment of O2 services for monitoring the performance of resources of O-Cloud 150. For example, in response to receiving requests for O2 services for monitoring the performance of resources within O-Cloud 150 via R1 interface 154, R1 interface 154 sends the requests to performance manager 160. Performance manager 160 may process the O2 services and may send the O2 services to O2 termination interface 169, which provides the O2 services to resources of O-Cloud 150 via O2 interface 167.

Configuration manager 162 is configured to control the deployment of O1 services for the configuration of near-RT RIC 124 and/or RAN nodes. For example, in response to receiving requests for O1 services for the configuration of near-RT RIC 124 from applications 123 via R1 interface 154, R1 interface 154 sends the requests to configuration manager 162. Configuration manager 162 may process the O1 services and may send the O1 services to O1 termination interface 168, which provides the O1 services to near-RT RIC 124 via O1 interface 166. Configuration manager 162 may also be configured to control the deployment of O2 services for the configuration of resources of O-Cloud 150. For example, in response to receiving requests for O2 services for configuring resources within O-Cloud 150 from applications 123 via R1 interface 154, R1 interface 154 sends the requests to configuration manager 162. Configuration manager 162 may process the O2 services and may send the O2 services to O2 termination interface 169, which provides the O2 services to resources of O-Cloud 150 via O2 interface 167.

In some examples, R1 interface 154 also exposes applications 123 to SME services, DME services, and/or other services. For example, in response to receiving requests for SME services from applications 123 via R1 interface 154, R1 interface 154 sends the requests to service manager 163. Service manager 163 may process the SME services (e.g., register/update a service) and may send the SME services to R1 termination 152, which provides the SME services to applications 123 via R1 interface 154 (e.g., sending response to application regarding service registration, update, or discovery). Similarly, in response to receiving requests for DME services from applications 123 via R1 interface 154, R1 interface 154 sends the requests to data manager 155. Data manager 155 may process the DME services and may send the DME services to R1 termination 152, which provides the DME services to applications 123 via R1 interface 154 (e.g., sending data from application configured as a data producer to application configured as a data consumer).

R1 interface 154 may also expose applications 123 to slice subnet management services, such as RAN NSSMF interfaces to retrieve slice service level agreements (SLAs) and slice topologies, and/or slice management, SLA, and slice performance management notifications to applications 123.

Figure 4:
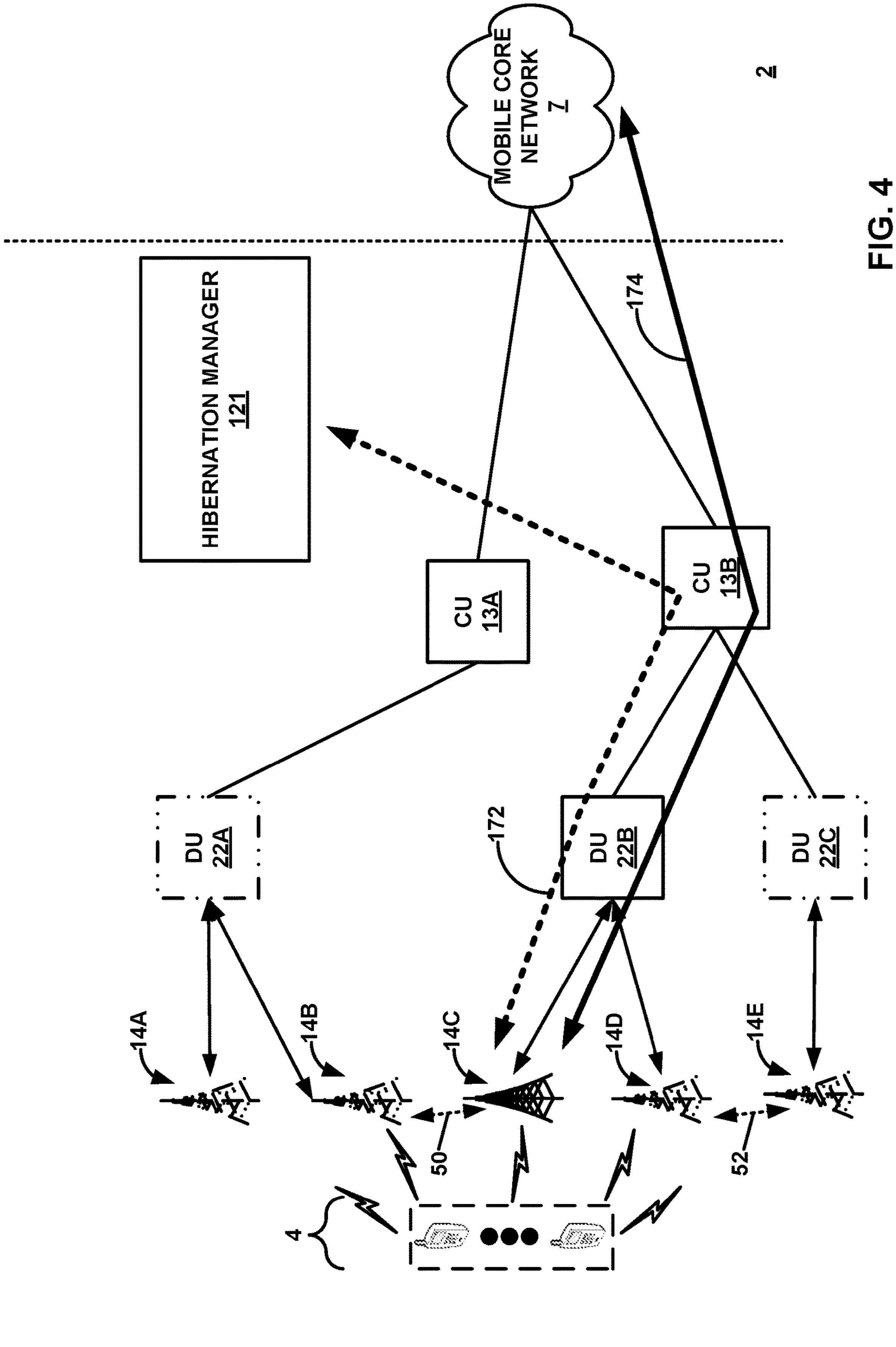
FIG. 4 is a block diagram illustrating a first hibernation and communication configuration of mobile network system of FIG. 1, in accordance with one or more techniques of this disclosure.

FIG. 4 is a block diagram illustrating a first hibernation and communication configuration of mobile network system 2 of FIG. 1, in accordance with one or more techniques of this disclosure. As seen in FIG. 4, in the first hibernation and communication configuration of mobile network system 2, hibernation manager 121 may communicate with RU 14C via hibernation manager communication path 172 and mobile core network 7 may communicate with RU 14C via active route 174.

Figure 5:
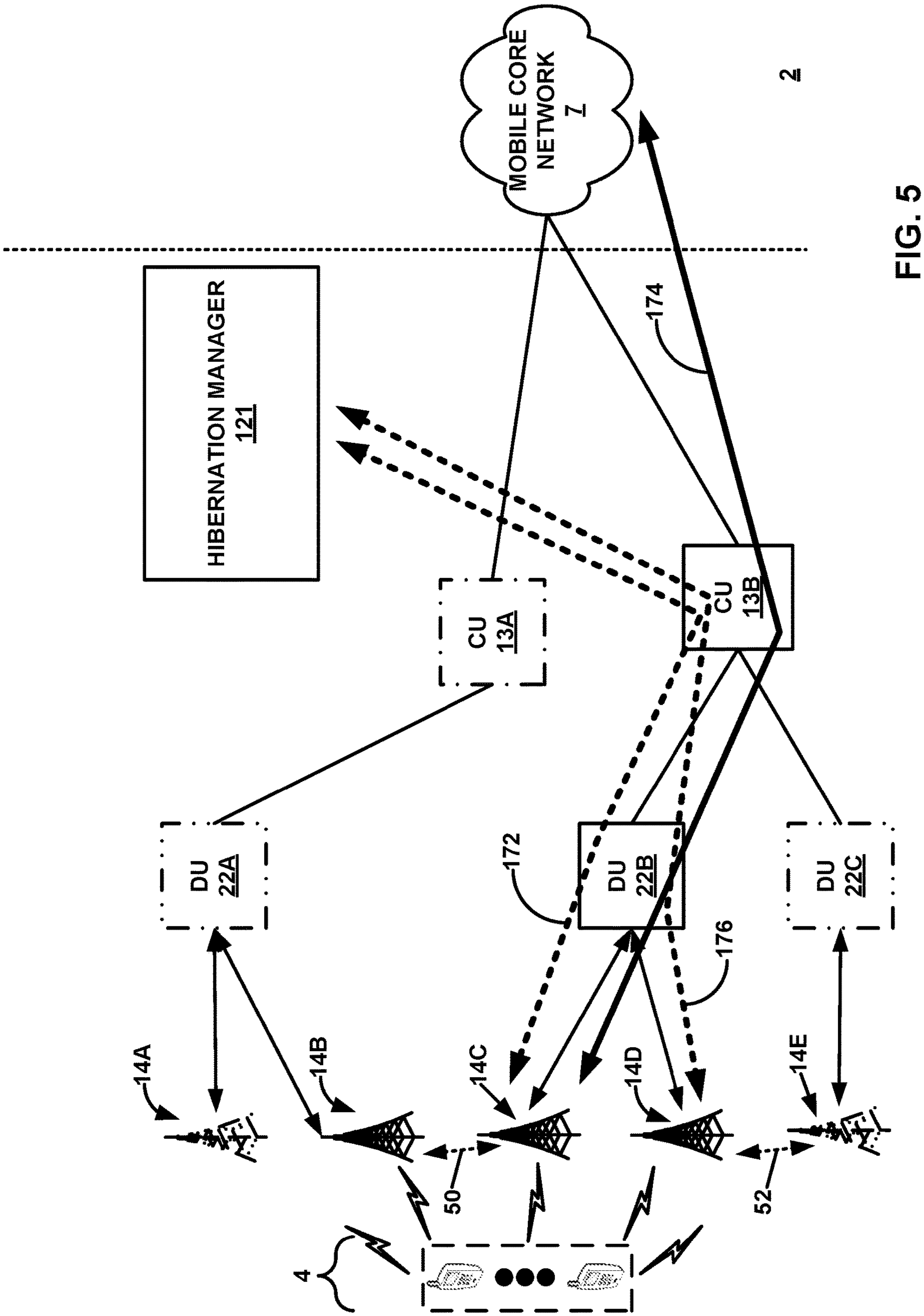
FIG. 5 is a block diagram illustrating a second hibernation and communication configuration of mobile network system of FIG. 1, in accordance with one or more techniques of this disclosure.
Figure 6:
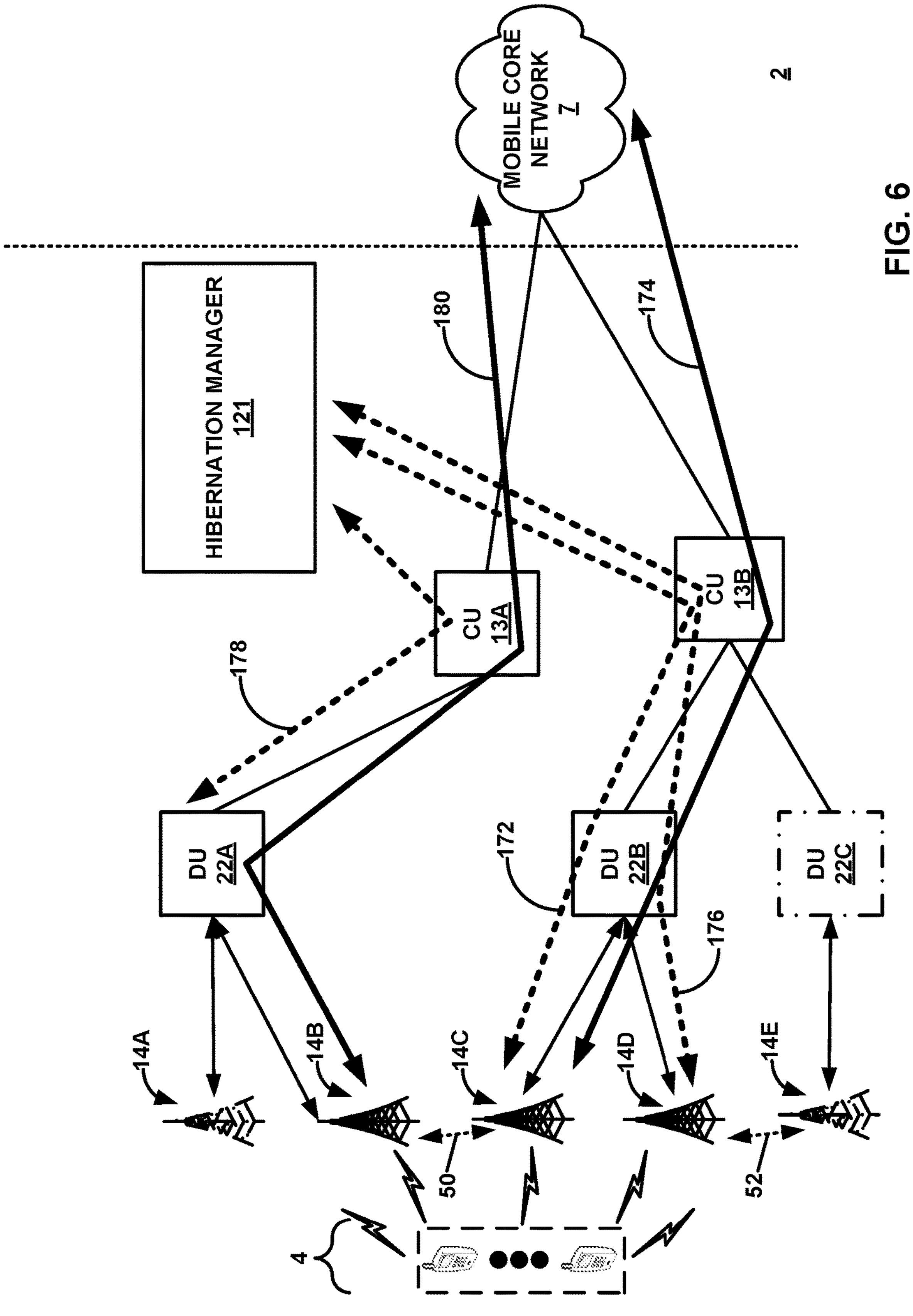
FIG. 6 is a block diagram illustrating a third hibernation and communication configuration of mobile network system of FIG. 1, in accordance with one or more techniques of this disclosure.
Figure 7:
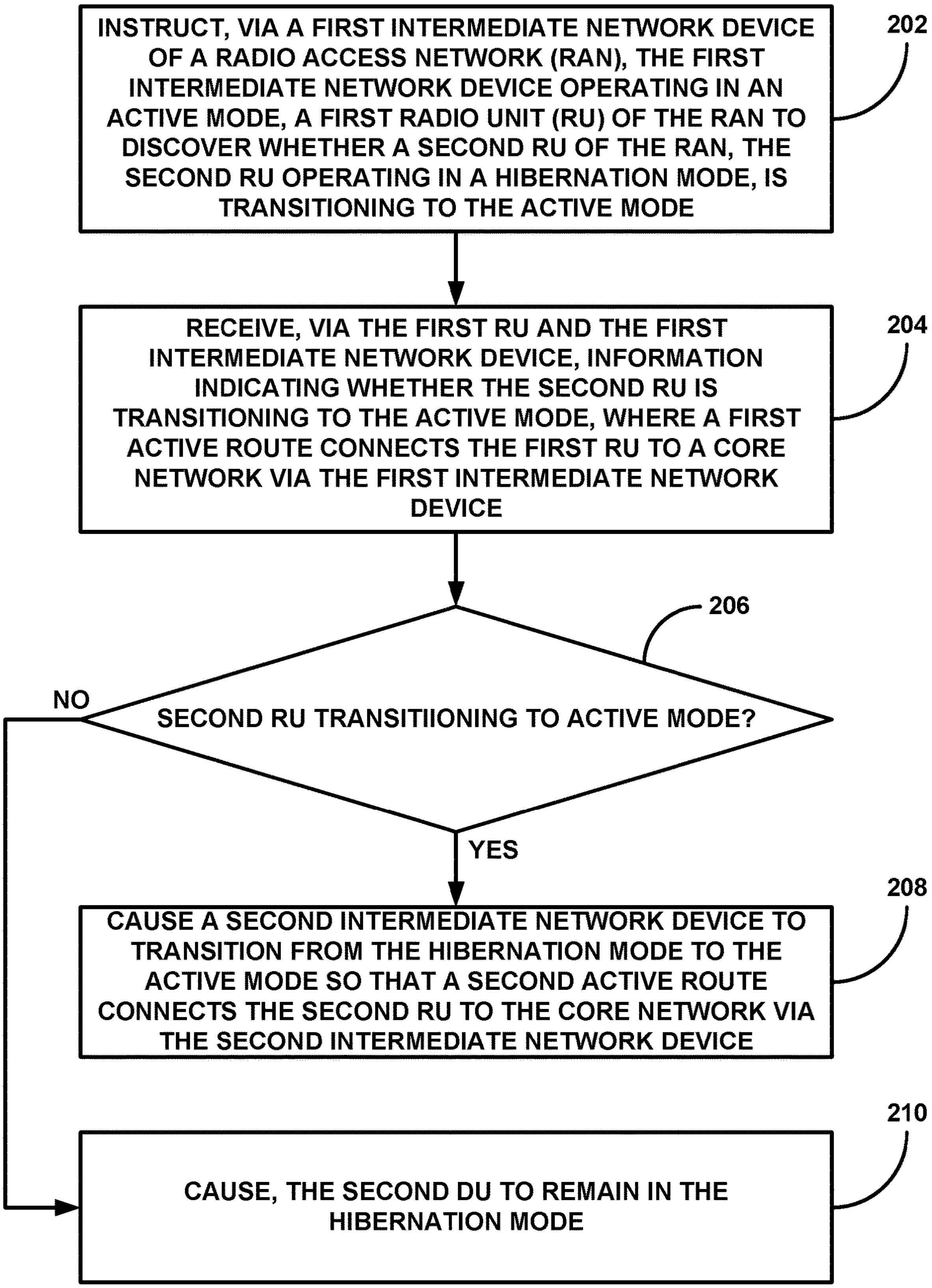
FIG. 7 is a flow diagram illustrating an example operation for managing hibernation of one or more devices of a radio access network, in accordance with one or more techniques of this disclosure.

In the first hibernation and communication configuration of mobile network system 2 RU 14A, RU 14B, RU 14D, RU 14E, DU 22A, and DU 22C operate according to the hibernation mode and CU 13A, CU 13B, RU 14C, and DU 22B operate according to the active mode. Since RU 14C, DU 22B, and CU 13B operate according to the active mode, there is an active route 174 connecting UEs 4 with mobile core network 7 via RU 14C, DU 22B, and CU 13B. Since DU 22A and DU 22C are operating in the hibernation mode, there is not an active route connecting UEs 4 and mobile core network 7 via DU 22A and there is not an active route connecting UEs 4 and mobile core network 7 via DU 22C. In FIGS. 5-7, hibernation mode of an RU or intermediate network device is illustrated with broken lines.

In some examples, hibernation manger 121 is configured to send instructions and/or receive information via intermediate devices (e.g., CUs 13 and DUs 22) that are operating in the active mode, and hibernation manger 121 is not configured to send instructions and/or receive information via intermediate devices (e.g., CUs 13 and DUs 22) that are operating in the hibernation mode. This means that hibernation manager 121 may communicate with RU 14C via hibernation manager communication path 172 through CU 13B and DU 22B, without being able to communicate with RU 14B via CU 13A and DU 22A. This is because when DU 22A is operating according to the hibernation mode, DU 22A does not provide a reliable communication path for hibernation manager 121 to communicate with RU 14B via DU 22A.

RU 14C is configured to communicate with RU 14B via communication link 50 even when RU 14B and DU 22A are operating according to the hibernation mode. Hibernation manager 121 is configured to instruct, via hibernation manager communication path 172, RU 14C to discover whether RU 14B is transitioning from the hibernation mode to the active mode. RU 14C discovers whether RU 14B is transitioning from the hibernation mode to the active node via communication link 50 and sends this information to hibernation manager 121 via hibernation manager communication path 172.

FIG. 5 is a block diagram illustrating a second hibernation and communication configuration of mobile network system 2 of FIG. 1, in accordance with one or more techniques of this disclosure. As seen in FIG. 5, in the second hibernation and communication configuration of mobile network system 2, hibernation manager 121 communicates with RU 14C via hibernation manager communication path 172, mobile core network 7 communicates with RU 14C via active route 174, and hibernation manager 121 communicates with RU 14D via hibernation manager communication path 176.

The second hibernation and communication configuration of FIG. 5 may be substantially the same as the first hibernation and communication configuration of FIG. 4, except that hibernation manager 121 is configured to both communicate with RU 14C via hibernation manager communication path 172 and hibernation manager 121 may communicate with RU 14D via hibernation manager communication path 176. RU 14D may be configured to communicate with RU 14E via communication link 52 even when RU 14D and DU 22C are operating according to the hibernation mode. Hibernation manager 121 is configured to instruct, via hibernation manager communication path 176, RU 14D to discover whether RU 14E is transitioning from the hibernation mode to the active mode. RU 14D discovers whether RU 14E is transitioning from the hibernation mode to the active node via communication link 52 and sends this information to hibernation manager 121 via hibernation manager communication path 176.

FIG. 6 is a block diagram illustrating a third hibernation and communication configuration of mobile network system 2 of FIG. 1, in accordance with one or more techniques of this disclosure. As seen in FIG. 6, in the third hibernation and communication configuration of mobile network system 2, hibernation manager 121 communicates with RU 14C via hibernation manager communication path 172, mobile core network 7 communicates with RU 14C via active route 174, hibernation manager 121 communicates with RU 14D via hibernation manager communication path 176, hibernation manager 121 communicates with DU 22A via hibernation manager communication path 176, and mobile core network 7 communicates with RU 14B via active route 180.

In the third hibernation and communication configuration of mobile network system 2 RU 14A, RU 14E, and DU 22C operate according to the hibernation mode and CU 13A, CU 13B, RU 14B, RU 14C, RU 14D, DU 22A, and DU 22B operate according to the active mode. Since RU 14C, DU 22B, and CU 13B operate according to the active mode, there is an active route 174 connecting UEs 4 with mobile core network 7 via RU 14C, DU 22B, and CU 13B. Since RU 14B, DU 22A, and CU 13A operate according to the active mode, there may be an active route 180 connecting UEs 4 with mobile core network 7 via RU 14B, DU 22A, and CU 13A. However, since DU 22C is operating in the hibernation mode, there are no active routes connecting UEs 4 and mobile core network 7 via DU 22C or hibernation manager communication paths by which hibernation manager 121 can communicate with RU 14E, other than indirectly via another RU in accordance with techniques describes herein.

In some examples, hibernation manager 121 may receive, via hibernation manager communication path 172, information indicating that RU 14B is transitioning from the hibernation mode to the active mode. Based on this information, hibernation manager 121 instructs, via hibernation manager communication path 178, DU 22A to transition from the hibernation mode to the active mode 22A so that an active route 180 connects UEs 4 with mobile core network 7 via RU 14B, DU 22A, and CU 13A. In some examples, by contrast, hibernation manager 121 may receive, via hibernation manager communication path 176, information indicating that RU 14E is remaining in the hibernation mode. Based on this information, hibernation manager 121 need not instruct DU 22C to transition to the active mode so that DU 22C remains in the hibernation mode, thereby saving power.

FIG. 7 is a flow diagram illustrating an example operation for managing hibernation of one or more devices of a radio access network, in accordance with one or more techniques of this disclosure. The example operation is described with respect to mobile network system 2 of FIG. 1, and components thereof. However, the techniques of FIG. 7 may be performed by different components of mobile network system 2, or by additional or alternative systems.

In some examples, hibernation manager 121 may instruct, via a first intermediate network device of RANs 9, the first intermediate network device operating in an active mode, a first RU of the RAN to discover whether a second RU of the RAN, the second RU operating in a hibernation mode, is transitioning to the active mode (202). In some examples, the first RU may comprise RU 14C, the second RU may comprise RU 14B, and the first intermediate network device may comprise DU 22B, but this is not required. The first RU may be another RU of RUs 14, the second RU may be another RU of RUs 14, the first intermediate network device may comprise another one of DUs 22 or one of RUs 13, or any combination thereof. Hibernation manager 121 may receive, via the first RU and the first intermediate network device, information indicating whether the second RU is transitioning to the active mode, where a first active route connects the first RU to mobile core network 7 via the first intermediate network device (204).

Since the first active route connects the first RU to mobile core network 7 via the first intermediate network device, hibernation manager 121 may use the first active route to obtain information indicating whether the second RU is transitioning to the active route without activating one or more intermediate network devices connecting the second RU to the mobile core network 7. This may allow the one or more intermediate network devices connecting the second RU to the mobile core network 7 to remain in hibernation mode and conserve energy unless hibernation manager 121 receives information indicating that the second RU is transitioning from the hibernation mode to the active mode via the first active route. When the hibernation manager 121 receives information indicating that the second RU is transitioning from the hibernation mode to the active mode, hibernation manager 121 may control one or more intermediate devices to create a second active route through the RANs 9 via the second RU so that communication may occur between UEs 4 and mobile core network 7 via the second RU.

For example, hibernation manager 121 may determine, based on the information, whether the second RU is transitioning to an active mode (206). When hibernation manager 121 determines that the second RU is transitioning to the active mode ("YES" at block 206), hibernation manager 121 may cause a second intermediate network device of RANs 9 to transition from the hibernation mode to the active mode so that the second active route connects the second RU to mobile core network 7 via the second intermediate network device (206). In some examples, the second intermediate network device comprises DU 22A, but this is not required. The second intermediate network device may include another DU of DUs 22 or one of CUs 13A. When hibernation manager 121 determines that the second RU is transitioning to the active mode ("NO" at block 206), hibernation manager 121 may cause the second DU to remain in the hibernation mode (210). Hibernation manager 121 may take no action to cause the second DU to remain in the hibernation mode.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, ROM, NVRAM, EEPROM, flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some respects, functionality described in this disclosure may be provided within software modules or hardware modules.

What is claimed is:

1. A controller comprising:

a memory; and processing circuitry in communication with the memory, wherein the processing circuitry is configured to:

instruct, via a first intermediate network device of a radio access network (RAN), the first intermediate network device operating in an active mode, a first radio unit (RU) of the RAN to discover whether a second RU of the RAN, the second RU operating in a hibernation mode, is transitioning to the active mode;

receive, via the first RU and the first intermediate network device, information indicating that the second RU is transitioning to the active mode, wherein a first active route connects the first RU to a core network via the first intermediate network device; and cause, based on receiving the information indicating that the second RU is transitioning to the active mode, a second intermediate network device operating in the hibernation mode to transition from the hibernation mode to the active mode so that a second active route connects the second RU to the core network via the second intermediate network device.

2. The controller of claim 1, wherein the processing circuitry is configured to instruct the first RU and receive the information indicating that the second RU is transitioning from the hibernation mode to the active mode without instructing the second intermediate network device to transition from the hibernation mode to the active mode.

3. The controller of claim 1, wherein the first intermediate network device is one of a distributed unit (DU) or a centralized unit (CU) of the RAN, and wherein the second intermediate network device is one of a DU or a CU of the RAN.

4. The controller of claim 3, wherein the first intermediate network device comprises a first DU, wherein the second intermediate network device comprises a second DU, wherein the first active route connects the first RU to the core network via the first DU and a first CU, and wherein the second active route connects the second RU to the core network via the second DU and a second CU.

5. The controller of claim 1, wherein the processing circuitry is further configured to:

cause, based on receiving the information indicating that the second RU is transitioning to the active mode, a third intermediate network device operating in the hibernation mode to transition from the hibernation mode to the active mode, wherein the second active route connects the second RU to the core network via the second intermediate network device and the third intermediate network device.

6. The controller of claim 1, wherein the processing circuitry is further configured to instruct, via the first intermediate network device, a third RU of the RAN to discover whether a fourth RU of the RAN, the fourth RU operating in the hibernation mode, is transitioning to the active mode to determine whether to cause a third intermediate network device to transition from the hibernation mode to the active mode so that a third active route connects the fourth RU to the core network via the third intermediate network device.

7. The controller of claim 6, wherein the processing circuitry is further configured to:

receive, via the third RU and the first intermediate network device, information indicating that the fourth RU is transitioning to the active mode; and cause the third intermediate network device to transition from the hibernation mode to the active mode so that the third active route connects the fourth RU to the core network via the third intermediate network device.

8. The controller of claim 6, wherein the processing circuitry is further configured to:

receive, via the third RU and the first intermediate network device, information indicating that the fourth RU is remaining in the hibernation mode; and cause the third intermediate network device to remain in the hibernation mode.

9. The controller of claim 1, wherein a device operating in the hibernation mode is deactivated during a plurality of sleep phases and is activated during a plurality of wake-up phases, wherein the plurality of sleep phases are at least partially interleaved with the plurality of wake-up phases so that a wake-up phase of the plurality of wake-up phases occurs between each pair of consecutive sleep phases of the plurality of sleep phases, and wherein the processing circuitry is configured to cause the second intermediate network device to transition from the hibernation mode to the active mode by causing the second intermediate network device to remain activated without returning to a sleep phase following a wake-up phase of the plurality of wake-up phases.

10. The controller of claim 9, wherein to instruct the first RU to discover whether the second RU is transitioning to the active mode, the processing circuitry is configured to instruct the first RU to discover whether the second RU is transitioning to remain activated following a wake-up phase of the plurality of wake-up phases without returning to a sleep phase of the plurality of sleep phases.

11. The controller of claim 9, wherein a duration of each wake-up phase of the plurality of wake-up phases is shorter than a duration of each sleep phase of the plurality of sleep phases.

12. The controller of claim 1, wherein to instruct the first RU to discover whether the second RU is transitioning to the active mode, the processing circuitry is configured to communicate with the first RU via the first active route to cause the first RU to communicate with the second RU via a wireless communication link between the first RU and the second RU.

13. A method comprising:

instructing, by processing circuitry of a controller via a first intermediate network device of a radio access network (RAN), the first intermediate network device operating in an active mode, a first radio unit (RU) of the RAN to discover whether a second RU of the RAN, the second RU operating in a hibernation mode, is transitioning to the active mode, wherein the processing circuitry is in communication with a memory of the controller;

receiving, by the processing circuitry via the first RU and the first intermediate network device, information indicating that the second RU is transitioning to the active mode, wherein a first active route connects the first RU to a core network via the first intermediate network device; and causing, by the processing circuitry based on receiving the information indicating that the second RU is transitioning to the active mode, a second intermediate network device operating in the hibernation mode to transition from the hibernation mode to the active mode so that a second active route connects the second RU to the core network via the second intermediate network device.

14. The method of claim 13, further comprising instructing, by the processing circuitry, the first RU, and receiving, by the processing circuitry, the information indicating that the second RU is transitioning from the hibernation mode to the active mode without instructing the second intermediate network device to transition from the hibernation mode to the active mode.

15. The method of claim 13, further comprising:

causing, by the processing circuitry based on receiving the information indicating that the second RU is transitioning to the active mode, a third intermediate network device operating in the hibernation mode to transition from the hibernation mode to the active mode, wherein the second active route connects the second RU to the core network via the second intermediate network device and the third intermediate network device.

16. The method of claim 13, further comprising instructing, by the processing circuitry via the first intermediate network device, a third RU of the RAN to discover whether a fourth RU of the RAN, the fourth RU operating in the hibernation mode, is transitioning to the active mode to determine whether to cause a third intermediate network device to transition from the hibernation mode to the active mode so that a third active route connects the fourth RU to the core network via the third intermediate network device.

17. The method of claim 16, further comprising:

receiving, by the processing circuitry via the third RU and the first intermediate network device, information indicating that the fourth RU is transitioning to the active mode; and causing, by the processing circuitry, the third intermediate network device to transition from the hibernation mode to the active mode so that the third active route connects the fourth RU to the core network via the third intermediate network device.

18. The method of claim 16, further comprising:

receiving, by the processing circuitry via the third RU and the first intermediate network device, information indicating that the fourth RU is remaining in the hibernation mode; and causing, by the processing circuitry, the third intermediate network device to remain in the hibernation mode.

19. The method of claim 13, wherein instructing the first RU to discover whether the second RU is transitioning to the active mode comprises communicating, by the processing circuitry, with the first RU via the first active route to cause the first RU to communicate with the second RU via a wireless communication link between the first RU and the second RU.

20. Non-transitory computer-readable media comprising instructions that, when executed by processing circuitry, cause the processing circuitry to:

instruct, via a first intermediate network device of a radio access network (RAN), the first intermediate network device operating in an active mode, a first radio unit (RU) of the RAN to discover whether a second RU of the RAN, the second RU operating in a hibernation mode, is transitioning to the active mode;

receive, via the first RU and the first intermediate network device, information indicating that the second RU is transitioning to the active mode, wherein a first active route connects the first RU to a core network via the first intermediate network device; and cause, based on receiving the information indicating that the second RU is transitioning to the active mode, a second intermediate network device operating in the hibernation mode to transition from the hibernation mode to the active mode so that a second active route connects the second RU to the core network via the second intermediate network device.

* * * * *